(12) United States Patent
Robinson et al.

(10) Patent No.: US 8,189,046 B2
(45) Date of Patent: May 29, 2012

(54) COMPUTER-BASED COMMUNICATION SYSTEMS AND ARRANGEMENTS ASSOCIATED THEREWITH FOR INDICATING USER STATUS

(75) Inventors: John T. Robinson, Yorktown Heights, NY (US); Michael E. Wazlowski, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 12/177,420

(22) Filed: Jul. 22, 2008

(65) Prior Publication Data
US 2008/0310683 A1    Dec. 18, 2008

Related U.S. Application Data

(63) Continuation of application No. 10/992,935, filed on Nov. 19, 2004, now abandoned.

(51) Int. Cl.
*H04N 7/16* (2011.01)
(52) U.S. Cl. ........ 348/143; 348/152; 348/153; 348/154; 348/155; 348/156
(58) Field of Classification Search .................. 348/143, 348/152–156
See application file for complete search history.

(56) References Cited

U.S. PATENT DOCUMENTS

| | | | |
|---|---|---|---|
| 5,914,747 A | 6/1999 | Hamilton | |
| 5,959,662 A | 9/1999 | Shaffer et al. | |
| 6,108,028 A | 8/2000 | Skarbo et al. | |
| 6,374,145 B1 | 4/2002 | Lignoul | |
| 6,448,978 B1 | 9/2002 | Salvador et al. | |
| 6,570,606 B1 | 5/2003 | Sidhu et al. | |
| 6,611,206 B2 | 8/2003 | Eshelman et al. | |
| 6,731,308 B1 | 5/2004 | Tang et al. | |
| 7,373,144 B1 | 5/2008 | Kirkpatrick et al. | |
| 7,409,423 B2 * | 8/2008 | Horvitz et al. | 709/206 |
| 2001/0043270 A1 | 11/2001 | Lourie et al. | |
| 2002/0019829 A1 | 2/2002 | Shapiro | |
| 2002/0126120 A1 | 9/2002 | Snowdon et al. | |
| 2002/0163572 A1 | 11/2002 | Center et al. | |
| 2003/0117486 A1 | 6/2003 | Ferren et al. | |
| 2005/0100192 A1 | 5/2005 | Fujimura et al. | |

FOREIGN PATENT DOCUMENTS

JP    62108691    5/1987

* cited by examiner

*Primary Examiner* — Jay Au Patel
*Assistant Examiner* — Geepy Pe
(74) *Attorney, Agent, or Firm* — Ference & Associates LLC

(57) ABSTRACT

A communication system for multiple users whereby an automatic indication of away status is prompted immediately upon a user's departure from the vicinity of a computer or other medium. In a preferred embodiment, this is accomplished, in an instant messaging environment, via a video camera arrangement whereby, upon there being a detection of a user's absence from the immediate vicinity, an automatic prompt is made to indicate away status for the user.

15 Claims, 2 Drawing Sheets

AUTOMATED AWAY STATUS

INSTANT MESSAGING SYSTYEM (PRIOR ART)

AUTOMATED AWAY STATUS

COMPUTER-BASED COMMUNICATION SYSTEMS AND ARRANGEMENTS ASSOCIATED THEREWITH FOR INDICATING USER STATUS

CROSS-REFERENCE TO RELATED APPLICATION

This application is a continuation application of copending U.S. patent application Ser. No. 10/992,935 filed on Nov. 19, 2004, now abandoned the contents of which are hereby fully incorporated by reference in its entirety.

FIELD OF THE INVENTION

The present invention relates to computer-based, multiple-user communication systems, such as instant messaging systems on the Internet, and arrangements for indicating user status within such systems.

BACKGROUND OF THE INVENTION

Concurrent with the explosive growth of the Internet and email, instant messaging systems have emerged as a favored mode of communication that presents many advantages. Among these are the capability of sending a text message via the internet to one or more other individuals at a speed and with an ease that makes email seem unwieldy and inefficient by comparison. Examples of instant messaging abound; some Internet providers have virtually made such systems part of their core identity. AOL in particular is well known for systems that permit a user to immediately ascertain, upon logging on, whether one or more individuals on a restricted list, or "group", are also online. Other known systems include those provided by Sametime Connect, Yahoo!, ICQ and others.

Generally, in conventional instant messaging systems, each user who is connected at a given time has a "status" that is known to other users in a group. At times, it may become necessary for a given user to leave the vicinity of his or her computer. Accordingly, there is often provided the option for a user to indicate an "away status"; that is, by selecting such a status option, a user is able to indicate to other users in the group that he or she is "away" from the computer and thus not available for communication. This may also have automatic ramifications, such as ensuring that no messages are directed to users who have indicated away status.

An associated disadvantage with such an arrangement is that should a user leave the vicinity of his or her computer without changing status to "away" (or an analogous status), other users in the group will erroneously believe that he or she is actually there. As a result, messages will be sent to the departed user in the expectation of receiving replies, and when no replies are received, it will not be clear as to what the status of the departed user actually is or whether there might be a network problem, etc.

Several solutions have been proposed for automatically prompting an indication of away status. One solution is to automatically initiate away status when a screen saver is activated, presumably in response to computer inactivity. This presents at least two problems: (1) there will likely be a time delay between the time that the user in question actually leaves the vicinity and the screen saver turns on, thus delaying the indication of away status and thus potentially confusing other users during that interim time; and (2) the user could actually be in the vicinity and ready and willing to reply to messages, but might not necessarily be active on the computer system itself, thus inviting the potential for a false indication of away status. Other solutions proposed over the years have been similarly problematic and ineffective.

Accordingly, a need has been recognized in connection with providing an automatic indicator of away status that does not lend itself to time lags and other difficulties that have been experienced heretofore.

SUMMARY OF THE INVENTION

In accordance with at least one presently preferred embodiment of the present invention, there is broadly contemplated a communication system for multiple users whereby an automatic indication of away status is prompted immediately upon a user's departure from the vicinity of a computer or other medium. In a preferred embodiment, this is accomplished, in an instant messaging environment, via a video camera arrangement whereby, upon there being a detection of a user's absence from the immediate vicinity, an automatic prompt is made to indicate away status for the user.

In summary, one aspect of the invention provides a method of indicating away status in a computer-based communication medium, the method comprising the steps of: providing a camera at a computer, the camera being adapted to detect motion of a user; determining, with the camera, whether a user is undergoing motion; and indicating away status of the user responsive to a determination that the user is not undergoing motion and subsequent to a predetermined time interval.

Another aspect of the invention provides an apparatus for indicating away status in a computer-based communication medium, the apparatus comprising: a camera adapted to detect motion of a user at a computer; an arrangement for determining, with the camera, whether a user is undergoing motion; and an arrangement for indicating away status of the user responsive to a determination that the user is not undergoing motion and subsequent to a predetermined time interval.

Furthermore, an additional aspect of the invention provides a program storage device readable by machine, tangibly embodying a program of instructions executable by the machine to perform method steps for indicating away status in a computer-based communication medium, the method comprising the steps of: providing a camera at a computer, the camera being adapted to detect motion of a user; determining, with the camera, whether a user is undergoing motion; and indicating away status of the user responsive to a determination that the user is not undergoing motion and subsequent to a predetermined time interval.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Preferably, there is broadly contemplated, in accordance with at least one presently preferred embodiment of the present invention, a system which includes a video camera, such as a low cost video camera, that may be built into a communication device such as a desktop or laptop computer. Preferably, the camera will detect motion and, in the absence of motion after a given time interval, away status will be automatically initiated for the messaging or conferencing system.

Though the image of a user might find some use in an instant messaging application, it is generally recognized that images need not usually be transmitted over the network; the utility of image transmission in such a context is indeed highly questionable to begin with. Accordingly, it is broadly contemplated herein that a video camera (e.g., a digital video camera) be provided for the dedicated purpose of ascertaining a user's absence or presence in the vicinity of the communication medium in question, or at least for such a purpose in addition to other possible uses. This would relieve the need to use a video camera to produce images viewable by other users in the network; it would indeed appear to be tedious for other users to determine a user's away status by, e.g., bringing up a window showing the images of such a user.

Let it be assumed that an attached or integral digital video camera (at a computer or other communication medium) produces a series of frames $l[x,y,t]$. Motion detection is easily accomplished by determining whether $(l[x,y,t+dt]-l[x,y,t])^2$, summed over both x and y from zero to maxima of x and y (corresponding to the two-dimensional field of video capture) is less than a threshold, for a specified number of frames at times $t, t+dt, t+2*dt, \ldots, t+n*dt$. (Of course, this is but one example of a motion detection method that can be employed; equivalently functioning methods abound.) Then, given an absence of detected motion for a user-specified time interval T (for example, one minute), the computer system or other communications arrangement preferably automatically sets away status with respect to the user.

Figure 1:
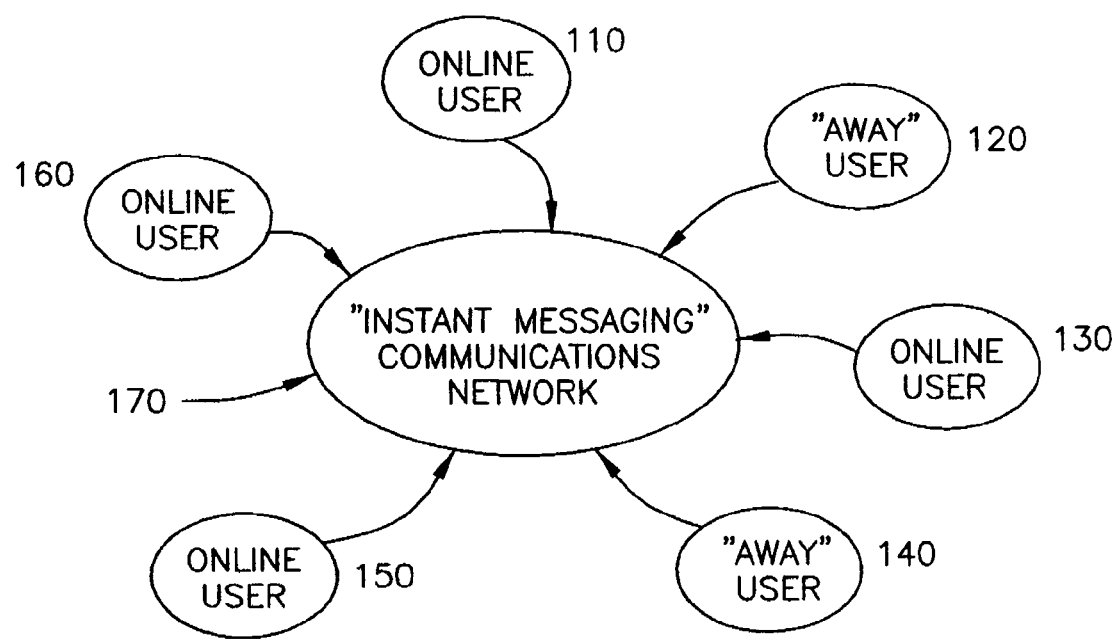
FIG. 1 schematically illustrates a conventional instant messaging arrangement.

FIG. 1 schematically illustrates a conventional instant messaging arrangement. In the context of an instant messaging communications network 170, several users (110-160) may be accessing the same at a given time. Online users 110, 130, 150 and 160 continue to communicate through the network 170 per usual while users indicating "away" status (120, 140) communicate such status to the network 170, where such information is made available to the other users. In conventional arrangements away status is specifically prompted by the user.

Figure 2:
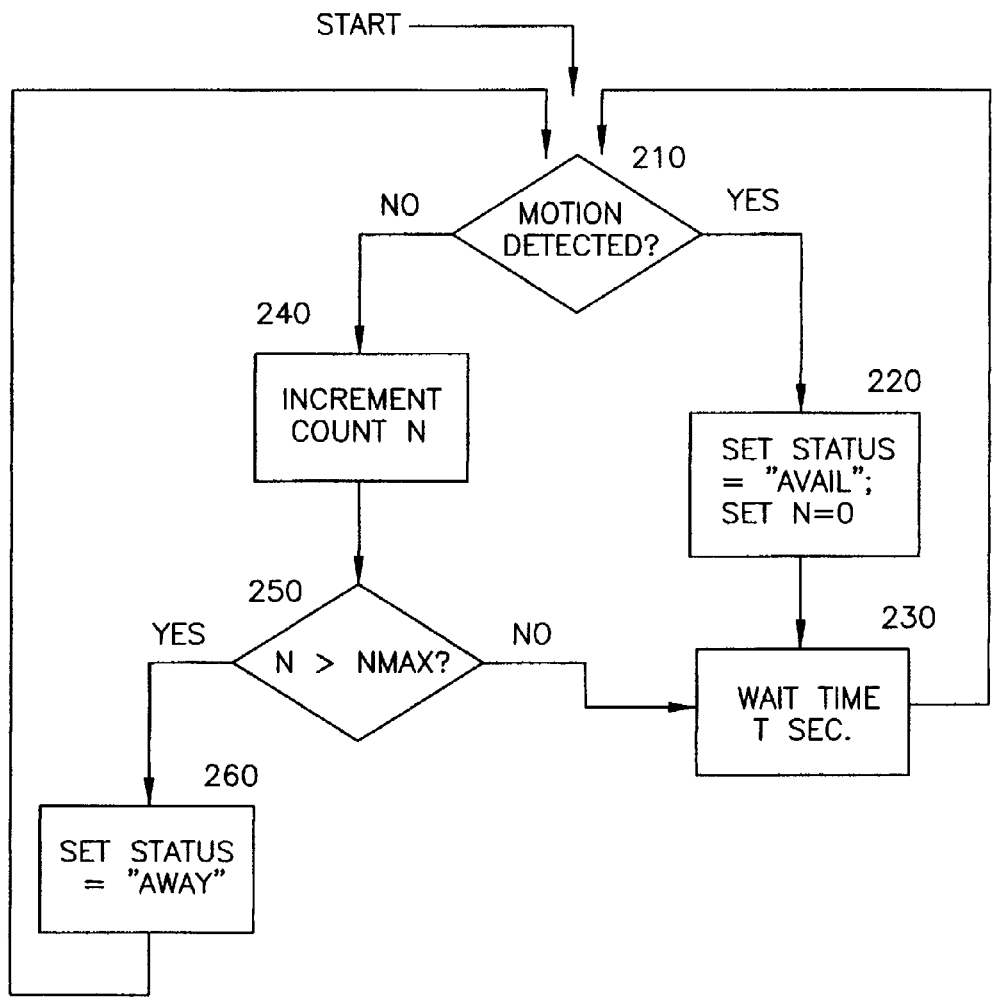
FIG. 2 schematically illustrates a process for manifesting automated away status.

FIG. 2 schematically illustrates a process for manifesting automated away status. By using photographic equipment, such as a digital video camera, as discussed heretofore, it is first determined as to whether motion is detected (210) as the camera ostensibly is pointed towards where the user would be sitting. If "yes", then (220) the user's status is set as "available" (or "AVAIL"), and increment count N is set to 0. After a predetermined wait time of T seconds (230), motion detection is queried once again (210).

If at any time no motion is detected then the increment count N is increased by 1 or some other constant (240). If N exceeds a threshold Nmax (250) then status is set as "AWAY" (260), and the motion detection step is repeated (210). If N is not greater than Nmax, then there is again a wait time of T seconds (230) until the motion detection step is repeated (210).

Preferably, several parameters can be set by the user. For instance, the user may or may not wish for a video feed to actually be sent out to the network; this can thus be turned on or off, while the video can still be used for motion detection in any case. The user may also set the "timeout" interval for the automatic initiation of away status (Nmax*T seconds in FIG. 2). If the user does not set this interval, then it can default to a reasonable value such as 30 seconds.

As shown in FIG. 2, by incrementing motion detection steps to a total of Nmax steps, a different time period may elapse between initial motion detection and setting of away status than between initial motion detection and the setting of available status. This ensures greater verification that a user indeed is away, since it is conceivable for a user to remain virtually motionless, and then immune to motion detection, when present.

Though a digital video camera has been discussed heretofore, it should be understood that a simple digital camera could alternatively be used. This would snap still shots at predetermined time intervals, and motion could be detected in a manner such as that discussed heretofore with regard to digital video cameras.

It is to be understood that the present invention, in accordance with at least one presently preferred embodiment, includes an arrangement for determining whether a user is undergoing motion and an arrangement for indicating away status of the user. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising: the steps of:
   providing an instant messaging arrangement at a computer, the instant messaging arrangement being configured to manifest an automated away status of a user;
   receiving input from a camera being adapted to detect absence or presence of the user in the vicinity of the computer based on the motion of the user in the vicinity of the computer; and
   substantially instantaneously indicating to a plurality of other users via an instant messaging communication network an away status of the user responsive to a determination that the user is not undergoing motion subsequent to a predetermined time interval and an available status of the user responsive to a determination that the user is undergoing motion subsequent to a predetermined time interval.

2. The method according to claim 1, wherein said step of providing a camera comprises providing a video camera.

3. The method according to claim 2, wherein:
   the predetermined time interval associated with away status is Nmax*T, where T is a predetermined wait time and Nmax is a predetermined number of increments of said determining step.

4. The method according to claim 3, wherein the predetermined time interval associated with available status is T.

5. The method according to claim 2, wherein the predetermined time interval associated with away status is preset by the user.

6. The method according to claim 2, wherein the video camera is integral with respect to a computer.

7. The method according to claim 2, further comprising the step of preselecting whether a video feed is to be sent from the video camera to a network.

8. An apparatus comprising:
an instant messaging arrangement configured to manifest an automated away status of a user, said instant messaging arrangement further comprising:
a computer; and
a camera adapted to detect absence or presence of the user in the vicinity of the computer based on motion of the user in the vicinity of the computer;
wherein the instant messaging arrangement is configured to automatically substantially instantaneously indicate to a plurality of other users via an instant messaging communications network the away status of the user in response to a determination that the user is not undergoing motion subsequent to a predetermined time interval and an available status of the user responsive to a determination that the user is undergoing motion subsequent to a predetermined time interval.

9. The apparatus according to claim 8, wherein said camera comprises a video camera.

10. The apparatus according to claim 9, wherein the predetermined time interval associated with away status is Nmax*T, where T is a predetermined wait time and Nmax is a predetermined number of increments of said determining step.

11. The apparatus according to claim 10, wherein the predetermined time interval associated with available status is T.

12. The apparatus according to claim 9, wherein the predetermined time interval associated with away status is preset by the user.

13. The apparatus according to claim 9, wherein said video camera is integral with respect to a computer.

14. The apparatus according to claim 9, further comprising an arrangement for preselecting whether a video feed is to be sent from said video camera to a network.

15. A non-transitory computer readable medium readable by machine, tangibly embodying a program of instructions executable by the machine to perform steps for indicating away status in a computer-based communication medium, said steps comprising:
providing an instant messaging arrangement at a computer, the instant messaging arrangement being configured to manifest an automated away status of a user;
receiving input from a camera being adapted to detect absence or presence of the user in the vicinity of the computer based on the motion of the user in the vicinity of the computer; and
substantially instantaneously indicating to a plurality of other users via an instant messaging communication network an away status of the user responsive to a determination that the user is not undergoing motion subsequent to a predetermined time interval and an available status of the user responsive to a determination that the user is undergoing motion subsequent to a predetermined time interval.

\* \* \* \* \*